United States Patent
Kanteti et al.

(10) Patent No.: US 10,579,606 B2
(45) Date of Patent: Mar. 3, 2020

(54) APPARATUS AND METHOD OF DATA ANALYTICS IN KEY-VALUE SOLID STATE DEVICE (KVSSD) INCLUDING DATA AND ANALYTICS CONTAINERS

(71) Applicant: Samsung Electronics Co., Ltd., Gyeonggi-do (KR)

(72) Inventors: Kumar Kanteti, Mountain View, CA (US); Vish Maram, San Jose, CA (US)

(73) Assignee: Samsung Electronics Co., Ltd (KR)

( * ) Notice: Subject to any disclaimer, the term of this patent is extended or adjusted under 35 U.S.C. 154(b) by 0 days.

(21) Appl. No.: 15/975,314

(22) Filed: May 9, 2018

(65) Prior Publication Data

US 2019/0340270 A1 Nov. 7, 2019

Related U.S. Application Data

(60) Provisional application No. 62/666,283, filed on May 3, 2018.

(51) Int. Cl.
*G06F 16/22* (2019.01)
*G06F 3/06* (2006.01)

(52) U.S. Cl.
CPC ........... *G06F 16/221* (2019.01); *G06F 3/061* (2013.01); *G06F 3/0638* (2013.01); *G06F 3/0665* (2013.01); *G06F 3/0673* (2013.01)

(58) Field of Classification Search
CPC ...... G06F 16/221; G06F 3/061; G06F 3/0638; G06F 3/0673
See application file for complete search history.

(56) References Cited

U.S. PATENT DOCUMENTS

2011/0040795 A1 2/2011 Gordon et al.
2012/0310982 A1* 12/2012 Jennery ................. G06F 16/278
707/781

(Continued)

FOREIGN PATENT DOCUMENTS

EP 3 252 592 12/2017
WO WO 2017/044047 3/2017

OTHER PUBLICATIONS

Ki, "Key Value SSD Explained—Concept, Device, System, and Standard," Storage Networking Industry Association (SNIA) Conference, Santa Clara, CA, Sep. 11-14, 2017, pp. 1-53.*

*Primary Examiner* — Glenn Gossage
(74) *Attorney, Agent, or Firm* — The Farrell Law Firm, P.C.

(57) ABSTRACT

An apparatus and a method are provided. The apparatus of data analytics in a key-value solid state device (KVSSD) are disclosed. The KVSSD includes at least one KVSSD data container; and at least one KVSSD analytics container associated with at least one of the at least one KVSSD data container. The KVSSD data and analytics containers may be configured to store data and data analytics results in key-value pairs. The apparatus may include a virtual analytics container which is configured to utilize a field programmable gate array (FPGA) for performing a logical operation on data stored in multiple containers. A key in a key-value pair stored in a KVSSD analytics container may include a KVSSD data container identifier, a logical offset, and a user key that is also a key in a KVSSD data container associated with the KVSSD data container identifier. A value in a key-value pair may include a header of a fixed size, and analytics result information that depends on a type stored in the header. The type may include a first type to indicate storing user data associated with analytics and a second type (Continued)

to indicate holding references within the KVSSD data container where a key is written.

16 Claims, 4 Drawing Sheets

(56)  References Cited

U.S. PATENT DOCUMENTS

| | | | |
|---|---|---|---|
| 2016/0328176 A1* | 11/2016 | Chiu | G06F 3/0647 |
| 2017/0109372 A1 | 4/2017 | Shimamoto | |
| 2017/0139594 A1 | 5/2017 | Ahn et al. | |
| 2017/0206259 A1 | 7/2017 | Yang et al. | |
| 2017/0220267 A1 | 8/2017 | Neelakanta et al. | |
| 2017/0242867 A1 | 8/2017 | Sinha et al. | |
| 2017/0300407 A1 | 10/2017 | Qiu et al. | |
| 2017/0316028 A1* | 11/2017 | Kanteti | G06F 9/544 |
| 2019/0005079 A1* | 1/2019 | Li | G06F 16/2272 |
| 2019/0080107 A1* | 3/2019 | Gupta | G06F 9/466 |
| 2019/0146682 A1* | 5/2019 | Subramanian | G06F 3/0611 |
| | | | 711/103 |
| 2019/0146701 A1* | 5/2019 | Kanteti | G06F 3/0641 |
| | | | 711/154 |

* cited by examiner

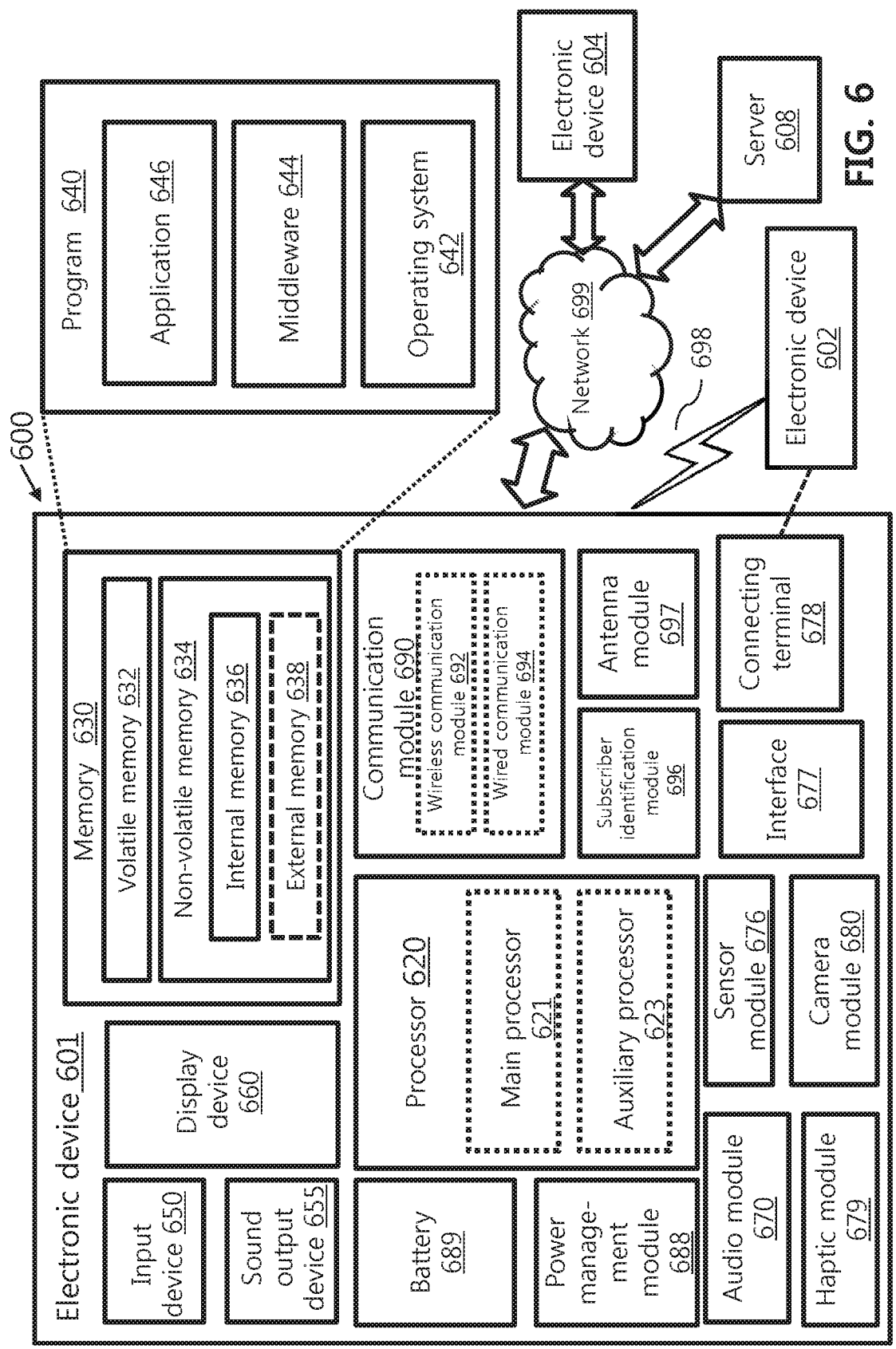

APPARATUS AND METHOD OF DATA ANALYTICS IN KEY-VALUE SOLID STATE DEVICE (KVSSD) INCLUDING DATA AND ANALYTICS CONTAINERS

PRIORITY

This application claims priority under 35 U.S.C. § 119(e) to U.S. Provisional patent application filed on May 3, 2018 in the United States Patent and Trademark Office and assigned Ser. No. 62/666,283, the entire contents of which are incorporated herein by reference.

FIELD

The present disclosure relates generally to data analytics, and more particularly, to data analytics in a key-value solid state device (KVSSD).

BACKGROUND

A KVSSD stores data in key-value pairs. A KVSSD is a data storage device for natively storing, retrieving, and managing data records stored in key-value pairs. These records are stored and retrieved using a key that uniquely identifies the record, which is used to quickly find the data within the storage device. A KVSSD uses an interface that is similar to an interface used by a conventional software key-value store. A KVSSD supports an interface that includes operations such as get, put, lookup, fetch, store, and find data.

RocksDB is an embeddable persistent key-value store for fast storage. However, the present disclosure is not limited to being applied to RocksDB but may be applied to any suitable application.

Conventional technologies use a host central processing unit (CPU) to perform data analytics, which is expensive in terms of CPU processing.

SUMMARY

According to one embodiment, an apparatus is provided. The apparatus includes a KVSSD including at least one KVSSD data container; and at least one KVSSD analytics container associated with at least one of the at least one KVSSD data container.

According to one embodiment, a method is provided. The method includes storing data in at least one KVSSD data container in a KVSSD; and analyzing, by at least one KVSSD analytics container, data in at least one of the at least one KVSSD data container associated with the at least one KVSSD analytics container.

BRIEF DESCRIPTION OF THE DRAWINGS

The above and other aspects, features, and advantages of certain embodiments of the present disclosure will be more apparent from the following detailed description, taken in conjunction with the accompanying drawings, in which:

FIG. 6 is a block diagram of an electronic device in a network environment, according to one embodiment.

DETAILED DESCRIPTION OF EMBODIMENTS OF THE PRESENT DISCLOSURE

Figure 1:
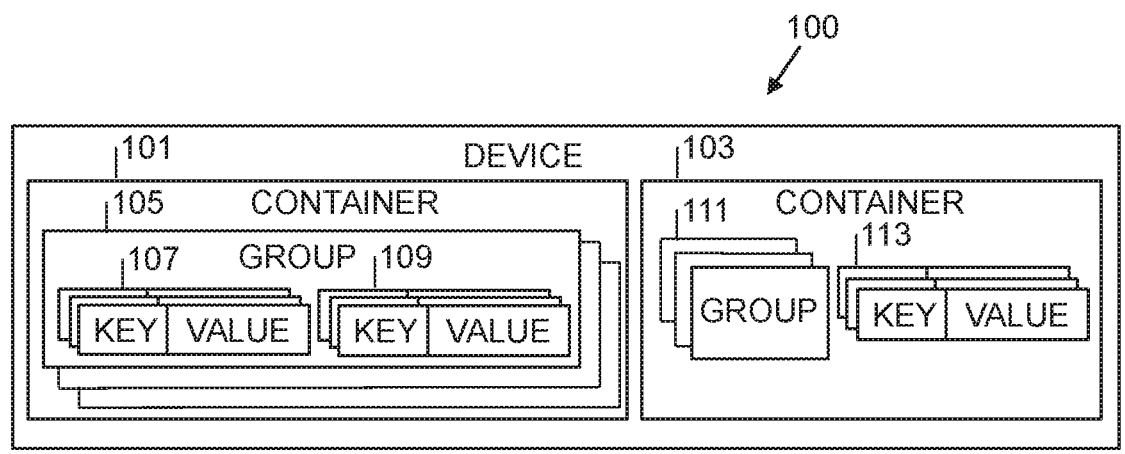
FIG. 1 is a block diagram of an electronic device with KVSSD containers for analytics, according to one embodiment.

Hereinafter, embodiments of the present disclosure are described in detail with reference to the accompanying drawings. It should be noted that the same elements will be designated by the same reference numerals although they are shown in different drawings. In the following description, specific details such as detailed configurations and components are merely provided to assist with the overall understanding of the embodiments of the present disclosure. Therefore, it should be apparent to those skilled in the art that various changes and modifications of the embodiments described herein may be made without departing from the scope of the present disclosure. In addition, descriptions of well-known functions and constructions are omitted for clarity and conciseness. The terms described below are terms defined in consideration of the functions in the present disclosure, and may be different according to users, intentions of the users, or customs. Therefore, the definitions of the terms should be determined based on the contents throughout this specification.

The present disclosure may have various modifications and various embodiments, among which embodiments are described below in detail with reference to the accompanying drawings. However, it should be understood that the present disclosure is not limited to the embodiments, but includes all modifications, equivalents, and alternatives within the scope of the present disclosure.

Although the terms including an ordinal number such as first, second, etc. may be used for describing various elements, the structural elements are not restricted by the terms. The terms are only used to distinguish one element from another element. For example, without departing from the scope of the present disclosure, a first structural element may be referred to as a second structural element. Similarly, the second structural element may also be referred to as the first structural element. As used herein, the term "and/or" includes any and all combinations of one or more associated items.

The terms used herein are merely used to describe various embodiments of the present disclosure but are not intended to limit the present disclosure. Singular forms are intended to include plural forms unless the context clearly indicates otherwise. In the present disclosure, it should be understood that the terms "include" or "have" indicate existence of a feature, a number, a step, an operation, a structural element, parts, or a combination thereof, and do not exclude the existence or probability of the addition of one or more other features, numerals, steps, operations, structural elements, parts, or combinations thereof.

Unless defined differently, all terms used herein have the same meanings as those understood by a person skilled in the art to which the present disclosure belongs. Terms such as those defined in a generally used dictionary are to be interpreted to have the same meanings as the contextual meanings in the relevant field of art, and are not to be interpreted to have ideal or excessively formal meanings unless clearly defined in the present disclosure.

In an embodiment, data analytics are performed in storage (e.g., in a KVSSD).

In an embodiment, data analytics are performed in container divisions in a KVSSD.

In an embodiment, data processing and searching are performed by containers associated with field programmable gate arrays (FPGAs).

In an embodiment, data analytics are performed in containers that are layered.

In an embodiment, data analytics in a KVSSD are performed using application programming interfaces (APIs).

In an embodiment, user content is analyzed and segregated into respective containers to facilitate data analytics in the containers.

In an embodiment, data containers and analytics containers store different types of data.

In an embodiment, an FPGA may be used to operate an analytics module for accelerating data analytics.

Software API's may be provided for RocksDB or any other application for integrating data analytics in a KVSSD.

In an embodiment, KVSSD containers are leveraged to support data analytics.

A KVSSD stores data in key-value pairs. Data in a KVSSD may be organized in containers. Containers act as a virtualization layer, and allow for exposure of a single KVSSD as multiple KVSSDs, or as distinct subdivisions of a KVSSD. Data in containers may also be stored in key-value pairs. Notably, two containers may have the same key.

In an embodiment, data analytics are performed in KVSSDs where containers are layered on each other. The containers (and their layering) provide insights into the data. As an example of data analytics, one may "search" for data patterns, and may configure containers to hold the results of such searches. As a specific example, a data analytics container may be made to capture all uniform resource locators (URLs) stored in a data set stored in a data container. Furthermore, analytics containers may serve as data containers for higher-level analytics containers, allowing for easy construction of systems to perform multi-step analysis.

In an embodiment, an API for applications (e.g., RocksDB) enables data analytics in a KVSSD.

FIG. 1 is a block diagram of an electronic device 100 with KVSSD containers for analytics, according to one embodiment.

Referring to FIG. 1, the electronic device 100 includes a first KVSSD container 101 and a second KVSSD container 103. A KVSSD container may be seen as a logical KVSSD inside a physical KVSSD. Herein, KVSSD containers may be of two types, a data container and an analytics container.

The first KVSSD container 101 includes at least one group 105 of key-value pairs. The at least one group 105 includes a first set of at least one key-value pair 107 and a second set of at least one key-value pair 109.

The second KVSSD container 103 includes at least one group 111 and a set of at least one key-value pair 113 that may be ungrouped. The group 111 may contain a plurality of key-value pairs (similar to group 105).

Figure 2:
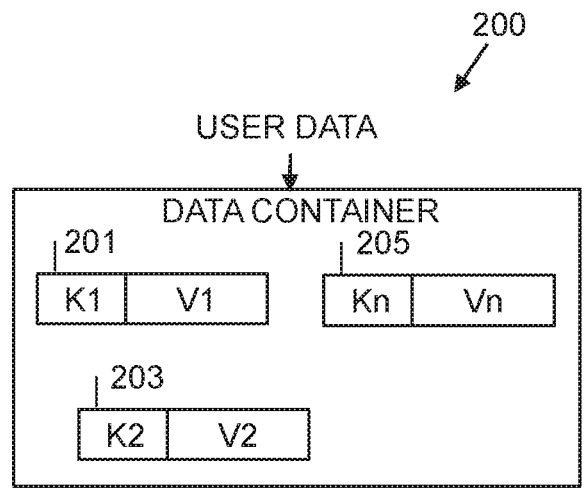
FIG. 2 is a block diagram of a KVSSD data container for analytics, according to one embodiment.

FIG. 2 is a block diagram of a KVSSD data container 200 for analytics, according to one embodiment.

Referring to FIG. 2, the KVSSD data container 200 holds data in key-value pairs (e.g., a first key-value pair 201, a second key-value pair 203, and an nth key-value pair 205). A key is a user (or application)-defined identifier for the data, and a value portion of a key-value pair stores user data.

The KVSSD data container 200 may (but need not necessarily) operate as a conventional KVSSD container.

Figure 3:
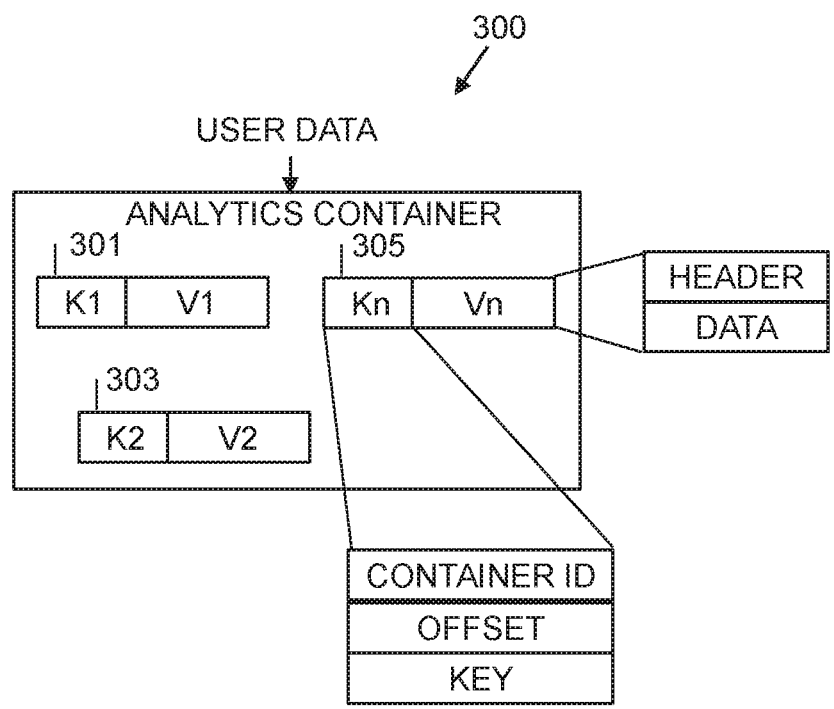
FIG. 3 is a block diagram of a KVSSD analytics container for analytics, according to one embodiment.

FIG. 3 is a block diagram of a KVSSD analytics container 300 for analytics, according to one embodiment.

Referring to FIG. 3, the KVSSD analytics container 300 holds analytics data in key-value pairs (e.g., a first key-value pair 301, a second key-value pair 303, and an nth key-value pair 305). However, in analytics containers, a key can store a container identifier (ID), an offset, and a user-defined key. A value portion of a key-value pair stores a header and analysis related data, as will be described below.

The KVSSD analytics container 300 stores the results of data analytics. Data analytics results stored in the KVSSD analytics container 300 are stored as key-value pairs. The KVSSD analytics container 300 is associated with one or more KVSSD data containers (e.g., KVSSD data container 200), which may be done via the container IDs of the analytics keys.

The key contains data container identifier(s), a logical offset into data in the data containers, and a user/application key, which may also be the key of the corresponding data container.

The value contains a header (e.g., a fixed size header stored in an initial portion of data). Analytics information is stored after the header. The type of analytics information found in the data portion of the value is indicated by the header. For example, a value with a header indicating "Type 0" may store user data associated with analytics (e.g., user data that is found to match a search). Alternatively, a value with a header indicating Type 1 may hold block locations within an associated data container where a key is stored, which can be used to retrieve data related to the analysis. (e.g., Type 0 contains actual data and Type 1 stores a reference to the block in the KVSSD data container holding the data). For example, if the KVSSD analytics container 300 is configured to search hypertext transfer protocol (HTTP) requests, the entire URL may be stored in the data.

Figure 4:
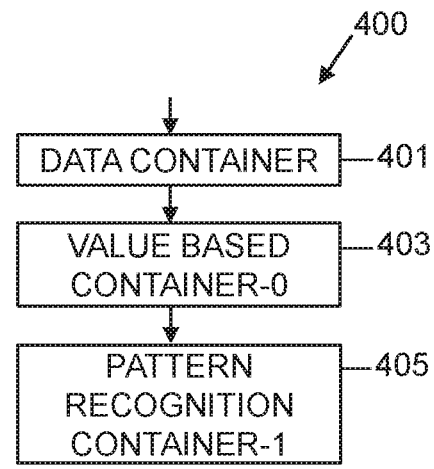
FIG. 4 is a block diagram of an electronic device 400 that includes layered KVSSD containers for analytics, according to one embodiment.

FIG. 4 is a block diagram of an electronic device 400 that includes layered KVSSD containers for analytics, according to one embodiment.

Referring to FIG. 4, the electronic device 400 includes a KVSSD data container 401, a KVSSD value-based container-0 403, and a KVSSD pattern recognition container-1 405.

KVSSD containers are organized in layers as shown in FIG. 4. A top layer is a KVSSD data container 401, which persistently stores user data in key-value pairs. An administrator or application may configure KVSSD analytics containers and associate them with data containers. For example, a KVSSD analytics container may be associated with more than one data container. KVSSD analytics containers may hold search-result data taken from data stored in KVSSD data containers. Analytics information may also be stored in key-value pairs in the KVSSD analytics containers.

An API for RocksDB may be enhanced to include analytics containers. However, the present disclosure is not limited thereto but may be applied to any suitable API. For example, a RocksDB API may communicate with a KVSSD to create an analytics container, for example, for HTTP requests (value based), and associate it with a KVSSD data container (e.g., KVSSD data container 401). A KVSSD (e.g., electronic device 400) may be configured to include an analytics container (e.g., value-based KVSSD container-0 403) and associate the analytics container with the data container (e.g., KVSSD data container 401). Further, an analytics container may utilize other analytics containers as base data containers to perform additional analysis on results of a prior analysis. That is, an analytics container may be used as a data container by other analytics containers and the data within the analytics containers may be analyzed for some further purpose (e.g., pattern recognition container-1 405 for pattern recognition and storage of recurrent HTTP information, etc.).

Figure 5:
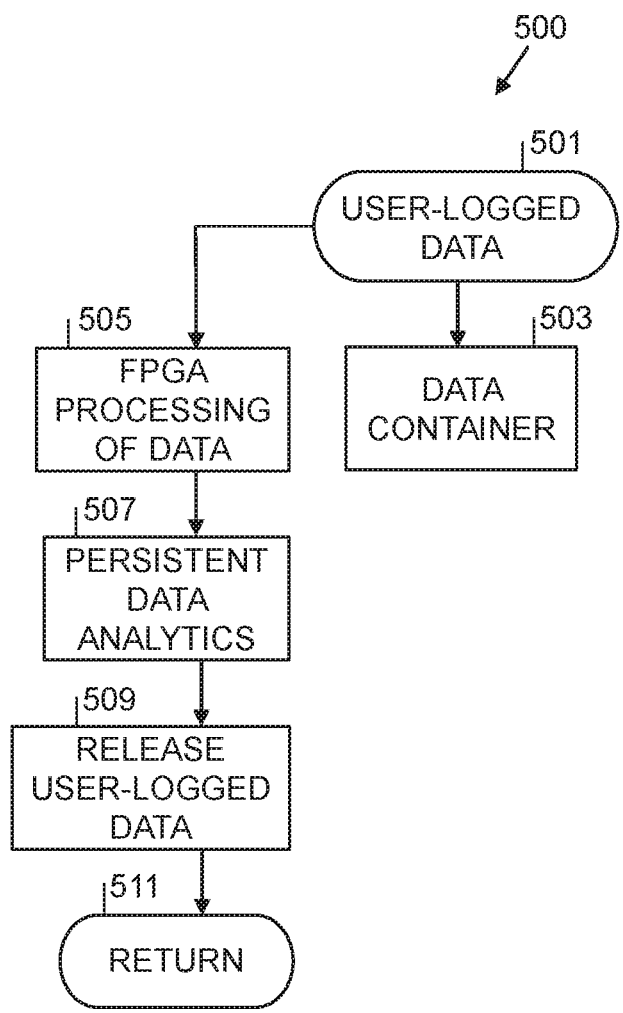
FIG. 5 is a block diagram of an input/output (I/O) path of a KVSSD container for analytics, according to one embodiment.

FIG. 5 is a block diagram of an I/O path 500 of a KVSSD container for analytics, according to one embodiment.

Referring to FIG. 5, a logging module 501 logs user data into a static random access memory (SRAM) for persistency to ensure that a data transaction is at a lowest level of detail (i.e., is atomic) across KVSSD containers.

The user-logged data is provided to a KVSSD data container 503 and an FPGA 505 for processing the user-logged data. The KVSSD 503 may allocate data blocks on a disk and persistently store data in key-value pairs in the data container. A reference to a block pointer or identified data may be passed to persistent data analytics module 507. The FPGA 505 enables faster data lookup, and may be located on or proximal to the KVSSD.

The persistent data analytics module 507 gathers information from the FPGA 505 and stores information in KVSSD analytics containers. That is, the FPGA 505 performs a certain analytics operation on data in a KVSSD data container and stores the results as a key-value pair in the analytics container in a format based on the type of analytics, type of data, and whether or not the data will be stored or referenced. User logged data is then released by a user logged data release module 509.

A return module 511 releases a data structure stored in the logging module 501, where the data structure is also stored persistently on a disk.

Virtual or non-virtual KVSSD analytics containers enable enhanced responsiveness to queries. For example, an administrator may create virtual KVSSD containers on top of two or more KVSSD analytics containers to represent a logical operation. For example, a virtual KVSSD container may be created to present the results of an "OR" operation on all data stored across multiple KVSSD containers. Internally, the virtual KVSSD container may use the FPGA 505 to perform the "OR" operation.

In an embodiment, four APIs are provided for RocksDB (or similar applications) for performing data analytics using KVSSDs.

A first API may be for configuring KVSSD analytics, which enables an administrator to create a KVSSD analytics container and associate it with a KVSSD data container.

A second API is a "delete KVSSD container API," which dis-associates a KVSSD analytics container from a KVSSD data container that was previously associated with the KVSSD analytics container. The KVSSD data container may be queried for performing a lookup.

A third API is "a destroy KVSSD container API," which terminates a KVSSD analytics container. Data analytics stored in a KVSSD analytics container that is terminated is erased and the storage space is reclaimed.

A fourth API is a "create a virtual KVSSD container API," which enables an administrator to create a virtual KVSSD container on top of either a KVSSD analytics container or another virtual KVSSD container. A virtual KVSSD container may be created, for example, for query optimizations, where a virtual KVSSD container does not necessarily need to store data but may use an FPGA to process data.

FIG. 6 is a block diagram of an electronic device 601 in a network environment 600, according to one embodiment.

Referring to FIG. 6, the electronic device 601 in the network environment 600 may communicate with an electronic device 602 via a first network 698 (e.g., a short-range wireless communication network), or an electronic device 604 or a server 608 via a second network 699 (e.g., a long-range wireless communication network). According to one embodiment, the electronic device 601 may communicate with the electronic device 604 via the server 608. The electronic device 601 may include a processor 620, a memory 630 (e.g., a KVSSD with data containers and analytics containers), an input device 650, a sound output device 655, a display device 660, an audio module 670, a sensor module 676, an interface 677, a haptic module 679, a camera module 680, a power management module 688, a battery 689, a communication module 690, a subscriber identification module (SIM) 696, or an antenna module 697. In one embodiment, at least one (e.g., the display device 660 or the camera module 680) of the components may be omitted from the electronic device 601, or one or more other components may be added to the electronic device 601. In one embodiment, some of the components may be implemented as a single integrated circuit (IC). For example, the sensor module 676 (e.g., a fingerprint sensor, an iris sensor, or an illuminance sensor) may be embedded in the display device 660 (e.g., a display).

The processor 620 may execute, for example, software (e.g., a program 640) to control at least one other component (e.g., a hardware or a software component) of the electronic device 601 coupled with the processor 620, and may perform various data processing or computations. According to one embodiment, as at least part of the data processing or computations, the processor 620 may load a command or data received from another component (e.g., the sensor module 676 or the communication module 690) in volatile memory 632, process the command or the data stored in the volatile memory 632, and store resulting data in non-volatile memory 634. According to one embodiment, the processor 620 may include a main processor 621 (e.g., a central processing unit (CPU) or an application processor (AP)), and an auxiliary processor 623 (e.g., a graphics processing unit (GPU), an image signal processor (ISP), a sensor hub processor, or a communication processor (CP)) that is operable independently from, or in conjunction with, the main processor 621. Additionally or alternatively, the auxiliary processor 623 may be adapted to consume less power than the main processor 621, or execute a particular function. The auxiliary processor 623 may be implemented as being separate from, or a part of, the main processor 621.

The auxiliary processor 623 may control at least some of the functions or states related to at least one component (e.g., the display device 660, the sensor module 676, or the communication module 690) among the components of the electronic device 601, instead of the main processor 621 while the main processor 621 is in an inactive (e.g., sleep) state, or together with the main processor 621 while the main processor 621 is in an active state (e.g., executing an application). According to one embodiment, the auxiliary processor 623 (e.g., an image signal processor or a communication processor) may be implemented as part of another component (e.g., the camera module 680 or the communication module 690) functionally related to the auxiliary processor 623.

The memory 630 (e.g., a KVSSD with data containers and analytics containers) may store various data used by at least one component (e.g., the processor 620 or the sensor module 676) of the electronic device 601. The various data may include, for example, software (e.g., the program 640) and input data or output data for a command related thereto. The memory 630 may include the volatile memory 632 or the non-volatile memory 634.

The program 640 may be stored in the memory 630 as software, and may include, for example, an operating system (OS) 642, middleware 644, or an application 646.

The input device 650 may receive a command or data to be used by another component (e.g., the processor 620) of the electronic device 601, from the outside (e.g., a user) of the electronic device 601. The input device 650 may include, for example, a microphone, a mouse, or a keyboard.

The sound output device 655 may output sound signals to the outside of the electronic device 601. The sound output device 655 may include, for example, a speaker or a receiver. The speaker may be used for general purposes, such as playing multimedia or a recording, and the receiver may be used for receiving an incoming call. According to one embodiment, the receiver may be implemented as being separate from, or a part of, the speaker.

The display device 660 may visually provide information to the outside (e.g., a user) of the electronic device 601. The display device 660 may include, for example, a display, a hologram device, or a projector and control circuitry to control a corresponding one of the display, hologram device, and projector. According to one embodiment, the display device 660 may include touch circuitry adapted to detect a touch, or sensor circuitry (e.g., a pressure sensor) adapted to measure the intensity of force incurred by the touch.

The audio module 670 may convert a sound into an electrical signal and vice versa. According to one embodiment, the audio module 670 may obtain the sound via the input device 650, or output the sound via the sound output device 655 or a headphone of an external electronic device (e.g., electronic device 602) directly (e.g., wiredly) or wirelessly coupled with the electronic device 601.

The sensor module 676 may detect an operational state (e.g., power or temperature) of the electronic device 601 or an environmental state (e.g., a state of a user) external to the electronic device 601, and then generate an electrical signal or data value corresponding to the detected state. According to one embodiment, the sensor module 676 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 677 may support one or more specified protocols to be used for the electronic device 601 to be coupled with the external electronic device (e.g., the electronic device 602) directly (e.g., wiredly) or wirelessly. According to one embodiment, the interface 677 may include, for example, a high definition multimedia interface (HDMI), a universal serial bus (USB) interface, a secure digital (SD™) card interface, or an audio interface.

A connecting terminal 678 may include a connector via which the electronic device 601 may be physically connected with the external electronic device (e.g., the electronic device 602). According to one embodiment, the connecting terminal 678 may include, for example, an HDMI connector, a USB connector, an SD™ card connector, or an audio connector (e.g., a headphone connector).

The haptic module 679 may convert an electrical signal into a mechanical stimulus (e.g., a vibration or a movement) or an electrical stimulus which may be recognized by a user via tactile sensation or kinesthetic sensation. According to one embodiment, the haptic module 679 may include, for example, a motor, a piezoelectric element, or an electrical stimulator.

The camera module 680 may capture a still image or moving images. According to one embodiment, the camera module 680 may include one or more lenses, image sensors, image signal processors, or flashes.

The power management module 688 may manage power supplied to the electronic device 601. According to one embodiment, the power management module 688 may be implemented as at least part of, for example, a power management integrated circuit (PMIC).

The battery 689 may supply power to at least one component of the electronic device 601. According to one embodiment, the battery 689 may include, for example, a primary cell which is not rechargeable, a secondary cell which is rechargeable, or a fuel cell.

The communication module 690 may support establishing a direct (e.g., wired) communication channel or a wireless communication channel between the electronic device 601 and the external electronic device (e.g., the electronic device 602, the electronic device 604, or the server 608) and performing communication via the established communication channel. The communication module 690 may include one or more communication processors that are operable independently from the processor 620 (e.g., the AP) and supports a direct (e.g., wired) communication or a wireless communication. According to one embodiment, the communication module 690 may include a wireless communication module 692 (e.g., a cellular communication module, a short-range wireless communication module, or a global navigation satellite system (GNSS) communication module) or a wired communication module 694 (e.g., a local area network (LAN) communication module or a power line communication (PLC) module). A corresponding one of these communication modules may communicate with the external electronic device via the first network 698 (e.g., a short-range communication network, such as Bluetooth™, wireless-fidelity (Wi-Fi) direct, or a standard of the Infrared Data Association (IrDA)) or the second network 699 (e.g., a long-range communication network, such as a cellular network, the Internet, or a computer network (e.g., LAN or wide area network (WAN)). These various types of communication modules may be implemented as a single component (e.g., a single IC), or may be implemented as multiple components (e.g., multiple ICs) that are separate from each other. The wireless communication module 692 may identify and authenticate the electronic device 601 in a communication network, such as the first network 698 or the second network 699, using subscriber information (e.g., international mobile subscriber identity (IMSI)) stored in the subscriber identification module 696.

The antenna module 697 may transmit or receive a signal or power to or from the outside (e.g., the external electronic device) of the electronic device 601. According to one embodiment, the antenna module 697 may include one or more antennas, and, therefrom, at least one antenna appropriate for a communication scheme used in the communication network, such as the first network 698 or the second network 699, may be selected, for example, by the communication module 690 (e.g., the wireless communication module 692). The signal or the power may then be transmitted or received between the communication module 690 and the external electronic device via the selected at least one antenna.

At least some of the above-described components may be mutually coupled and communicate signals (e.g., commands or data) therebetween via an inter-peripheral communication scheme (e.g., a bus, a general purpose input and output (GPIO), a serial peripheral interface (SPI), or a mobile industry processor interface (MIPI)).

According to one embodiment, commands or data may be transmitted or received between the electronic device 601 and the external electronic device 604 via the server 608 coupled with the second network 699. Each of the electronic devices 602 and 604 may be a device of a same type as, or a different type, from the electronic device 601. According to one embodiment, all or some of operations to be executed at the electronic device 601 may be executed at one or more of the external electronic devices 602, 604, or 608. For example, if the electronic device 601 should perform a function or a service automatically, or in response to a request from a user or another device, the electronic device 601, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 601. The electronic device 601 may provide the outcome, with or without further processing of the outcome, as at least part of a reply to the request. To that end, a cloud computing, distributed computing, or client-server computing technology may be used, for example.

The electronic device according to one embodiment may be one of various types of electronic devices. The electronic devices may include, for example, a portable communication device (e.g., a smart phone), a computer, a portable multimedia device, a portable medical device, a camera, a wearable device, or a home appliance. According to one embodiment of the disclosure, an electronic device is not limited to those described above.

The terms used in the present disclosure are not intended to limit the present disclosure but are intended to include various changes, equivalents, or replacements for a corresponding embodiment. With regard to the descriptions of the accompanying drawings, similar reference numerals may be used to refer to similar or related elements. A singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, terms such as "$1^{st}$," "$2^{nd}$," "first," and "second" may be used to distinguish a corresponding component from another component, but are not intended to limit the components in other aspects (e.g., importance or order). It is intended that if an element (e.g., a first element) is referred to, with or without the term "operatively" or "communicatively", as "coupled with," "coupled to," "connected with," or "connected to" another element (e.g., a second element), it indicates that the element may be coupled with the other element directly (e.g., wiredly), wirelessly, or via a third element.

As used herein, the term "module" may include a unit implemented in hardware, software, or firmware, and may be used with other terms, for example, "logic," "logic block," "part," and "circuitry." A module may be a single integral component, or a minimum unit or part thereof, adapted to perform one or more functions. For example, according to one embodiment, a module may be implemented in a form of an application-specific integrated circuit (ASIC).

One embodiment may be implemented as software (e.g., the program 640) including one or more instructions that are stored in a storage medium (e.g., internal memory 636 or external memory 638) that is readable by a machine (e.g., the electronic device 601). For example, a processor (e.g., the processor 620) of the machine (e.g., the electronic device 601) may invoke at least one of the one or more instructions stored in the storage medium, and execute it, with or without using one or more other components under the control of the processor. Thus, a machine may be operated to perform at least one function according to the at least one instruction invoked. The one or more instructions may include code generated by a complier or code executable by an interpreter. A machine-readable storage medium may be provided in the form of a non-transitory storage medium. The term "non-transitory" indicates that the storage medium is a tangible device, and does not include a signal (e.g., an electromagnetic wave), but this term does not differentiate between where data is semi-permanently stored in the storage medium and where the data is temporarily stored in the storage medium.

According to one embodiment, a method of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., Play Store™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to one embodiment, each component (e.g., a module or a program) of the above-described components may include a single entity or multiple entities. According to one embodiment, one or more of the above-described components may be omitted, or one or more other components may be added. Alternatively or additionally, a plurality of components (e.g., modules or programs) may be integrated into a single component. In this case, the integrated component may still perform one or more functions of each of the plurality of components in the same or similar manner as they are performed by a corresponding one of the plurality of components before the integration. Operations performed by the module, the program, or another component may be carried out sequentially, in parallel, repeatedly, or heuristically, or one or more of the operations may be executed in a different order or omitted, or one or more other operations may be added.

Although certain embodiments of the present disclosure have been described in the detailed description of the present disclosure, the present disclosure may be modified in various forms without departing from the scope of the present disclosure. Thus, the scope of the present disclosure shall not be determined merely based on the described embodiments, but rather determined based on the accompanying claims and equivalents thereto.

What is claimed is:

1. An apparatus, comprising:
 a key-value solid state device (KVSSD) including at least one KVSSD data container; and at least one KVSSD analytics container associated with at least one of the at least one KVSSD data container,
wherein the at least one KVSSD analytics container is configured to store data analytics results in key-value pairs,
wherein a value in a key-value pair stored in the at least one KVSSD analytics container includes a header, and analytics result information that depends on a type stored in the header, and
wherein the type stored in the header includes a first type to indicate storing user data associated with analytics and a second type to indicate holding references within the at least one KVSSD data container where the key is written.

2. The apparatus of claim 1, wherein the at least one KVSSD data container is configured to store data in key-value pairs.

3. The apparatus of claim 1, wherein the apparatus further includes at least one virtual analytics container associated with at least one of the at least one KVSSD analytics container.

4. The apparatus of claim 3, wherein each of the at least one virtual analytics container is configured to perform a logical operation on data stored in multiple containers.

5. The apparatus of claim 4, wherein each of the at least one virtual analytics container is configured to utilize a field programmable gate array for performing the logical operation.

6. The apparatus of claim 1, wherein a key in a key-value pair stored in the at least one KVSSD analytics container includes a KVSSD data container identifier, a logical offset into data in a KVSSD data container associated with the KVSSD data container identifier, and a user key that is also a key in the KVSSD data container associated with the KVSSD data container identifier.

7. The apparatus of claim 1, wherein the header is of a fixed size stored in an initial portion of data.

8. The apparatus of claim 1, further comprising a field programmable gate array configured to receive data stored in the at least one KVSSD data container, perform an analytic operation on the data, and store results of the analytic operation in the at least one KVSSD analytics container in a key-value pair.

9. A method, comprising:
storing data in at least one key-value solid state device (KVSSD) data container in a KVSSD;
analyzing, by at least one KVSSD analytics container, data in at least one of the at least one KVSSD data container associated with the at least one KVSSD analytics container;
storing data analytics results in key-value pairs in the at least one KVSSD analytics container;
including a header in which a type is stored in a value in a key-value pair stored in the at least one KVSSD analytics container, wherein the value includes analytics result information that depends on the type stored in the header; and
including a first type in the type stored in the header to indicate storing user data associated with analytics and including a second type in the type stored in the header to indicate holding references within the at least one KVSSD data container where the key is written.

10. The method of claim 9, further comprising storing data in key-value pairs in the at least one KVSSD data container.

11. The method of claim 9, further comprising associating at least one virtual analytics container with at least one of the at least one KVSSD analytics container.

12. The method of claim 11, further comprising performing a logical operation on data stored in multiple containers by at least one of the at least one virtual analytics container.

13. The method of claim 12, further comprising performing the logical operation using a field programmable gate array included in the at least one of the at least one virtual analytics container.

14. The method of claim 9, further comprising including a KVSSD data container identifier, a logical offset into data in a KVSSD data container associated with the KVSSD data container identifier, and a user key that is also a key in the KVSSD data container associated with the KVSSD data container identifier in a key in a key-value pair stored in the at least one KVSSD analytics container.

15. The method of claim 9, wherein the header is of a fixed size stored in an initial portion of data.

16. The method of claim 9, further comprising receiving, in a field programmable gate array, data stored in the at least one KVSSD data container, performing an analytic operation on the data, and storing results of the analytic operation in the at least one KVSSD analytics container in a key-value pair.

* * * * *

UNITED STATES PATENT AND TRADEMARK OFFICE
CERTIFICATE OF CORRECTION

| | |
|---|---|
| PATENT NO. | : 10,579,606 B2 |
| APPLICATION NO. | : 15/975314 |
| DATED | : March 3, 2020 |
| INVENTOR(S) | : Kanteti et al. |

Page 1 of 1

It is certified that error appears in the above-identified patent and that said Letters Patent is hereby corrected as shown below:

On the Title Page

Left side column, Line 10, Inventor name "Vish" should read as --Vishwanath--.

Signed and Sealed this
Eighth Day of September, 2020

Andrei Iancu
*Director of the United States Patent and Trademark Office*